United States Patent [19]  
Cirkel et al.

[11] 4,365,337  
[45] Dec. 21, 1982

[54] EXCITATION SYSTEM FOR A FAST PULSED DISCHARGE

[75] Inventors: Hans-Jürgen Cirkel; Willi Bette, both of Erlangen, Fed. Rep. of Germany

[73] Assignee: Kraftwerk Union Aktiengesellschaft, Mülheim, Fed. Rep. of Germany

[21] Appl. No.: 177,442

[22] Filed: Aug. 12, 1980

[30] Foreign Application Priority Data

Aug. 13, 1979 [DE] Fed. Rep. of Germany ...... 2932781

[51] Int. Cl.$^3$ .............................................. H01S 3/09
[52] U.S. Cl. ......................................... 372/87; 572/87
[58] Field of Search ................... 331/94.5 AE, 24.5 G

[56] References Cited

U.S. PATENT DOCUMENTS

| | | | |
|---|---|---|---|
| 3,795,874 | 3/1974 | Pan et al. | 331/94.5 AE |
| 4,039,971 | 8/1977 | Wang et al. | 331/94.5 AE |
| 4,093,927 | 6/1978 | Levine | 372/84 |

OTHER PUBLICATIONS

"Folder Parallel-Plate N$_2$ Laser" Lot et al; IBM Technical Bulletin, vol. 18, No. 3, Aug. 1975.
"Miniaturized Atmospheric Pressure Nitrogen Laser" vonBergmann et al., Jour. of Physics E: Scientific Inst. 1977, vol. 10, 1977.
Ultraviolet-preionized discharge-pumped lasers in XeF, KrF and ArF by Burnham et al., *App. Phys. Lett.*, vol. 29, Noll, 1 Dec. 76, pp. 707–709.

*Primary Examiner*—William L. Sikes
*Assistant Examiner*—Leon Scott, Jr.
*Attorney, Agent, or Firm*—Herbert L. Lerner; Laurence A. Greenberg

[57] ABSTRACT

Excitation system for fast pulsed discharge with excitation by a highly homogeneous arc-free capacitor-discharge in a gas space between and defined by at least two electrodes of a laser chamber, the two electrodes being spaced from one another and extending parallel to the optical axis of the laser, and with first and second stripline capacitors for induction-free energy-storage and for contacting the laser electrodes and electrodes of a fast high-voltage switching gap associated therewith, respectively, includes a plurality of electrodes forming part of the first and the second stripline capacitors, a plurality of dielectric layers disposed between the capacitor electrodes, the dielectric layers and the capacitor electrodes extending substantially normally to the optical axis of the laser and being stacked substantially parallel to the optical axis of the laser in a capacitor stack, and laterally extending connecting lugs connecting the capacitor electrodes to the electrodes of the laser chamber.

22 Claims, 13 Drawing Figures

EXCITATION SYSTEM FOR A FAST PULSED DISCHARGE

The invention relates to an excitation system for a fast pulsed discharge, especially a high-energy laser of the TEA type, and more particularly with excitation by a highly homogeneous arc-free capacitor-discharge in a gas space between and defined by at least two electrodes of the laser chamber, the two electrodes being spaced from one another and extending parallel to the optical axis of the laser, and with first and second stripline capacitors for induction-free energy-storage and for contacting the laser electrodes and electrodes of a fast high-voltage switching gap associated therewith, respectively.

Such an excitation system is fundamentally known (note "Applied Physics Letters", Vol. 10, No. 1, January 1967, pages 3 and 4, especially FIG. 1, hereinafter referred to as literature reference (1)). TEA lasers (transversely excited atmospheric pressure lasers), due to their high peak power and short pulse widths or durations have become particularly important. In these lasers, the laser gas which is under high pressure (50 mbar to several bar) as compared to longitudinally excited gas lasers (HeNe-lasers), is excited by an homogeneous electric discharge with several kilovolts via two extended electrodes which are disposed opposite one another parallel to the optical axis (which is the direction of emission of the laser).

Examples, of the laser type mentioned hereinabove are the $CO_2$-laser in the infrared region of the spectrum and, for visible spectrum and near UV, the $N_2$-laser and excimer lasers (for a definition of the excimer laser note, for example, "Physics Today", May 1978, pages 32 to 39 and, in particular, the lefthand and middle columns on page 32, hereinafter referred to as literature reference (2)). In TEA lasers, however, the initially homogeneous electric discharge has a tendency to degenerate into individual spark channels, which can result in an interruption of the laser emission and the destruction of the electrodes. For these reasons, it is necessary to operate TEA lasers with high-voltage pulses of large current and short half-amplitude width. Several systems are known from the scientific literature which meet these requirements (note, in addition to the two hereinaforecited literature refernces (1) and (2), also "physical Review Letters", Vol. 25, No. 8, pages 491 to 497 (3) and "Applied Physics Letters", Vol. 29, No. 11, 1976, pages 707 to 709 (4)).

To obtain the necessary short rise times for the high-voltage pulses, capacitors with extremely small self-inductance and lead inductance must be used. For this purpose, stripline capacitors such as are shown in (1), are suited. The disadvantage of these capacitors is the specific capacity thereof. Lengthening the capacitor stripline brings with the desired increase in capacity, also an increase in inductance, which lowers the resonance frequency of the corresponding resonant circuit and thereby increases the rise times of the high-voltage pulse to an impermissible value. Thus, the electric energy which can be stored in the capacitors with a fixed voltage and can maximally be supplied to the laser gas, is limited to a relatively small value. In principle, the energy could be increased only by an increase of the voltage. Because of the insulation problems connected therewith, this approach, however, would lead to larger spacings between the voltage-carrying parts and thereby to an increase of the inductance, which could be compensated for only by a reduction of the effective capacity. In this connection, the employment of fast switches for high voltages makes the problem considerably more difficult.

The invention of the instant application takes a different approach. It is an object thereof to provide an excitation system for a fast pulsed discharge wherein the energy content of the high-voltage pulse for a constant charging voltage is increased, for this purpose, the capacity of the capacitor is increased in such a manner that, the self-inductance of the capacitor and that of the leads to the laser can be reduced simultaneously.

With the foregoing and other objects in view, there is provided, in accordance with the invention, an excitation system for fast pulsed discharge with excitation by a highly homogeneous arc-free capacitor-discharge in a gas space between and defined by at least two electrodes of a laser chamber, the two electrodes being spaced from one another and extending parallel to the optical axis of the laser, and with first and second stripline capacitors for low-induction energy-storage and for contacting the laser electrodes and electrodes of a fast high-voltage switching gap associated therewith, respectively, comprising a plurality of electrodes forming part of the first and the second stripline capacitors, a plurality of dielectric layers disposed between the capacitor electrodes, the dielectric layers and the capacitor electrodes extending substantially normally to the optical axis of the laser and being stacked substantially parallel to the optical axis of the laser in a capacitor stack, and laterally extending connecting lugs connecting the capacitor electrodes to the electrodes of the laser chamber. The advantages obtainable by the invention are in particular that the energy content of the high-voltage pulses is substantially increased in comparison with heretofore known excitation systems, with the charging voltage kept constant, without having to tolerate a corresponding rise of the self-inductance and therewith, an increase of the switching times resulting therefrom. The inductance per unit of capacity (H/F) even becomes smaller. The capacity of the first and the second individual stripline capacitors (smallest common capacity unit) as well as the number n of the stacks can be varied. It is furthermore possible to predetermine the inductance of the contacts of an individual electrode within certain ranges. All of these possible variations allow optimum adaptation or matching of the electric circuit formed by the system to the physical parameters of the gas discharge path, which is formed between the electrodes of the laser chamber.

In accordance with another feature of the invention, the capacitor electrodes and the dielectric layers of the first and second stripline capacitors are structurally united, respectively, into a miniature common capacitance unit, n of such capacitance units, wherein n=1,2 ... n-1, n, being joined together in stacking direction and parallel to the laser axis, respectively.

In accordance with a further feature of the invention, mutually adjacent capacitance units are disposed, respectively, in stacking direction with the capacitor electrodes and dielectric layers thereof in a mirror-image manner relative to an imaginary symmetry plane extending normally to the laser axis between the capacitance units.

In accordance with an added feature of the invention, the individual stripline capacitors and capacitance units, respectively, have a basic, substantially rectangular shape and the capacitor stack is somewhat parallelepipedal, the laser chamber and the connecting lugs associated therewith being disposed at a longitudinal side of the somewhat parallelepipedal stack.

In accordance with an additional feature of the invention, the laser chamber and the fast high-voltage switching gap are disposed on opposite longitudinal sides of the capacitor stack, and a capacitor electrode, respectively, common to the first and the second stripline capacitor is disposed as a substantially hairpin-shaped folded band between respective other capacitor electrodes of the stripline capacitors so that one folded-band half thereof is disposed directly opposite the capacitor electrode connected between one of the electrodes of the laser chamber and one electrode of the switching gap, and the other folded-band half is disposed directly opposite the capacitor electrode connected to one of another electrode of the laser chamber and of the switching gap, the folded-band capacitor electrode being connected to one of the one electrode of the switching gap and the one electrode of the laser chamber.

In accordance with yet another feature of the invention, the fast high-voltage switching gap is a substantially tubular spark gap having the electrodes thereof extending parallel to the axis of the laser, the substantially tubular spark gap being disposed on a side of the capacitor stack facing away from the laser chamber and being connected by the electrodes thereof to the laterally extending connecting lugs of the respective capacitor electrodes.

In accordance with yet a further feature of the invention, the excitation system includes a Bluemlein circuit in which the first and the second stripline capacitors are connected for generating a laser excitation pulse.

In accordance with an alternate feature of the invention, the excitation system includes a charge-transfer circuit in which the first and the second stripline capacitors are connected for generating a laser excitation pulse.

In accordance with yet an added feature of the invention, the fast high-voltage switching gap is a substantially tubular spark gap, the substantially tubular spark gap being formed with electrode bores normal to the axis of the substantially tubular spark gap and distributed along the length of the spark gap, trigger pins being insulatingly received in the electrode bores and being energizable by a high-voltage ignition pulse applicable thereto.

In accordance with yet an additional feature of the invention, the excitation system comprises a common switching capacitance having a high-voltage pole, a plurality of trigger capacitances, the trigger pins being connected via the trigger capacitances to the high-voltage pole of the common switching capacitance and on a side of the trigger capacitances connected to the trigger pins, the trigger capacitances being connected to one another and to ground potential via balancing impedances selected from high-resistivity resistances and inductances, one of a fast switching thyratron and a fast switching spark gap being connected in parallel with the common switching capacitance for releasing an ignition pulse.

In accordance with another feature of the invention, n partial capacitor stacks encompass at least one respective capacitance unit of the capacitor stack, the fast high-voltage switching gap comprising n thyratrons connected in parallel with one another, a respective thyratron being operatively associated with a respective partial capacitor stack.

In accordance with a further feature of the invention, mutually adjacent capacitance units are disposed, respectively, in stacking direction with the capacitor electrodes and dielectric layers thereof in a mirror-image manner relative to an imaginary symmetry plane extending normally to the laser axis between the capacitance units, each of the partial capacitor stacks, respectively, encompassing two of the capacitance units disposed in a mirror-image manner with respect to one another.

In accordance with a further feature of the invention, the capacitor electrodes of the first and the second stripline capacitors are formed with a cutout for the laser chamber, the laser chamber being disposed, insulated for high-voltage, within the cutout, the fast high-voltage switching gap being disposed, on the other hand, at the outer periphery of the capacitor electrodes in parallel with the laser axis.

In accordance with an added feature of the invention, the dielectric layers are formed of dielectric liquid, the capacitor electrodes being at the same potential and being united into metal plates immersed in the dielectric liquid.

In accordance with an added feature of the invention, the dielectric liquid is chemically pure water.

In accordance with alternative features of the invention, the laser is an excimer laser, a $CO_2$ laser, a Cu-vapor laser or an $N_2$ laser.

In accordance with a further feature of the invention, the wall of at least one of the laser chamber and the high-voltage switching gap is formed of pure $Al_2O_3$ ceramic having a purity of at least 95%.

In accordance with a concomitant alternative feature of the invention, the excitation system is in combination with an electron beam gun or in combination with a Marx generator for generating high energy pulses therefor.

Other features which are considered as characteristic for the invention are set forth in the appended claim.

Although the invention is illustrated and described herein as embodied in an excitation system for a fast pulsed discharge, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 4 is a partly perspective, partly schematic view of the charge-transfer circuit for providing a better understanding thereof;

Figure 1:
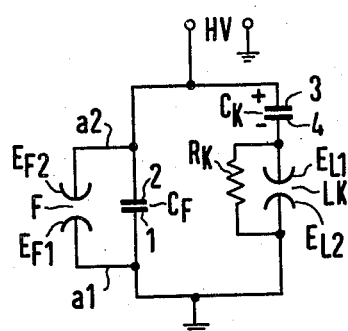
FIG. 1 is a diagram of a Bluemlein circuit, as is found in the state of the art for generating laser excitation pulses.

Referring now to the drawing and first, particularly, to FIG. 1 thereof, there is shown a Bluemlein circuit symbolizing a laser chamber LK with two electrodes $E_{L1}$ and $E_{L2}$ and a fast high-voltage switching gap in the form of a spark gap F with two electrodes $E_{F1}$ and $E_{F2}$. The spark gap F with an external circuit yet to be described hereinafter serves for firing a gas discharge or for applying a high-voltage pulse between the electrodes $E_{L1}$ and $E_{L2}$. Shunted across the spark gap F is a first low-induction stripline capacitor $C_F$, the electrodes 1 and 2 of which are connected to the spark gap F via connecting lugs a1 and a2 which have as little inductance as possible. Connected in series with the laser chamber LK is a second low-inductance stripline capacitor $C_K$, the two electrodes 2 and 3 of the capacitors $C_F$ and $C_K$ being connected to each other and to the high potential of a high-voltage source HV. On the side of ground potential, the electrodes $E_{F1}$ and $E_{L2}$ of the spark gap F and of the laser chamber LK, respectively, as well as the electrode 1 of the first capacitor $C_F$ are connected to each other and tied to ground potential. The electrode $E_{L1}$ of the laser chamber Lk and the electrode 4 of the second capacitor $C_K$, respectively, are connected to ground potential via a resistor which has a high resistance in comparison with that of the fired plasma.

Figure 1A:
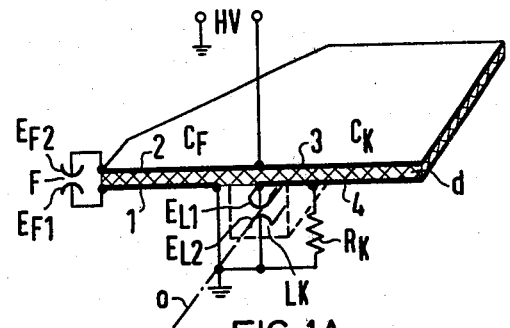
FIG. 1A is a partly perspective and partly schematic view of the circuit according to FIG. 1 for providing a better understanding thereof.

In FIG. 1A, the circuit diagram according to FIG. 1 is transposed into a three-dimensional or perspective view of a stripline capacitor arrangement, which is very similar to the illustration in FIG. 1 of the literature reference [1] or to that according to FIG. 1 of German Published Prosecuted Application (DE-AS) Ser. No. 21 35 109, the dielectric between the electrodes 1 and 2, on the one hand, and 3 and 4, on the other hand, is identified by reference character d.

The operation of the circuit according to FIGS. 1 and 1A is as follows. The capacitors $C_F$ and $C_K$ are charged to the high voltage HV. The laser chamber LK is connected via the high-resistance resistor $R_K$ to ground potential. After the switch F is closed (spark gap fired), a high voltage builds up between the electrodes of the laser chamber LK, and a voltage breakdown occurs, the laser gas being excited to emission. Besides spark gaps F, thyratrons can also be considered as suitable high-voltage switching gaps. The invention proceeds from the excitation system for fast pulsed gas discharges shown in FIGS. 1 and 1A, which is constructed as a high-energy laser of the TEA type. The excitation within the laser chamber LK occurs due to a capacitor discharge, which is as homogeneous as possible and without arc, between the two electrodes $E_{L1}$ and $E_{L2}$ which extend parallel to the optical axis o of the laser LK and are disposed spaced from and opposite each other. The first and second stripline capacitors $C_F$ and $C_K$ serve for providing low-inductance energy storage and for making contact with the laser electrodes $E_{L1}$ and $E_{L2}$ and the associated high-voltage switching gap F with the electrodes $E_{F1}$ and $E_{F2}$, which effects the application of a high-voltage pulse to the laser electrodes.

Figure 2:
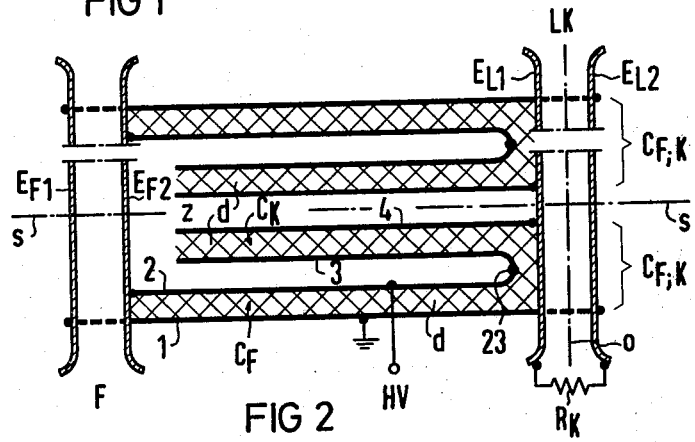
FIG. 2 is a longitudinal sectional view of a first embodiment of an excitation system according to the invention, only two capacity units thereof, each formed of a first and a second stripline capacitor, being shown.
Figure 3:
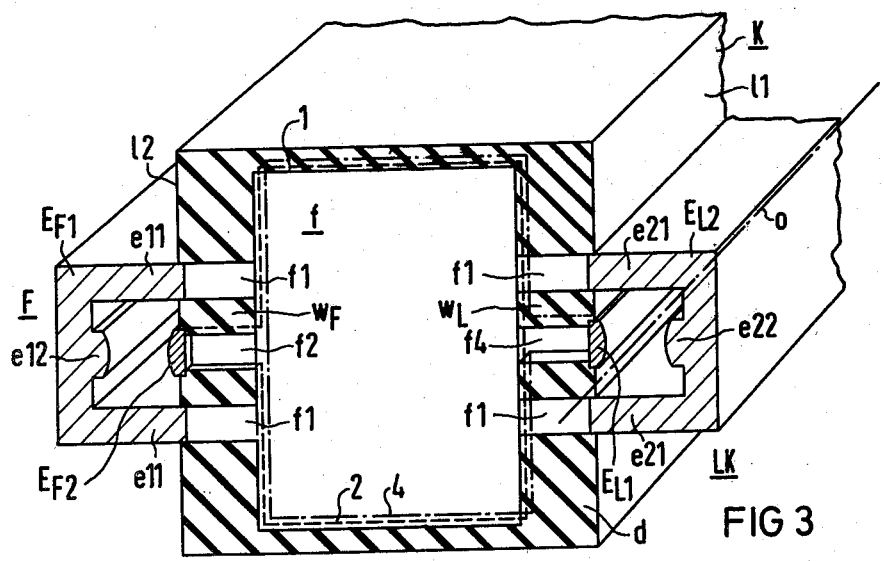
FIG. 3 is a perspective view of FIG. 2.

In a first embodiment of the invention of the instant application shown in FIGS. 2 and 3, in contrast to the conventional construction of FIG. 1A, the electrodes 1 to 4 of the first and second stripline capacitors $C_F$ and $C_K$ and the dielectric layers d therebetween extend substantially normally to the optical axis o of the laser LK. Furthermore, the electrodes 1 to 4 are stacked substantially parallel to the optical axis o of the laser LK to form a capacitor stack and are connected to the electrodes $E_{L1}$ and $E_{L2}$ of the laser chamber LK by laterally outwardly extending connecting lugs generally identified by reference character f. The stripline capacitors $C_F$ and $C_K$ are thus tilted or tipped 90° to the optical axis o of the laser LK; thereby, n smallest common capacitance units $C_{F,K}$ can be stacked parallel to the laser axis and can be contacted serially at the laser chamber LK, where n = 1,2...n−1,n. The laser chamber LK and the fast high-voltage switching gap, referred to hereinafter, in brief, as the switching gap F, are shown only diagrammatically as tubular structures in comparison with the presentation in FIG. 3; a simple structural embodiment is shown in perspective view in FIG. 3. The switching gap F may be a multi-channel spark gap with electrodes $E_{F1}$, $E_{F2}$ correspondingly extending parallel to the laser chamber and the laser axis; this switching gap F can be realized, however, also by fast-switching thyratrons, as is explained hereinafter. By comparing FIGS. 1, 1A and FIG. 2, it is found that the excitation system according to FIG. 2 is likewise based on a Bluemlein circuit. Accordingly, the electrodes of the first and second stripline capacitor $C_F$ and $C_K$ are identified by the same reference characters 1, 2, 3, 4 as in FIG. 1. The dielectric layers d are disposed between the electrodes 1, 2 and 3, 4, respectively, which are at different high-voltage potentials during operation. In the space between the two capacity units $C_{F,K}$, the electrodes 4, 4 and 2, 3 could also be combined structurally into a single electrode, since they are at the same potential (they are both connected to the same electrode $E_{L1}$ of the laser chamber LK). An integrated construction of the electrodes 4, 4 and 2, 3 is taken into consideration especially if a liquid dielectric e.g. chemically pure water, is used. This variation is explained hereinafter in connection with FIG. 11.

In particular, the electrode 1 of the stripline capacitor $C_F$ in FIG. 2 makes contact with the electrode $E_{F1}$ of the switching gap and with the electrode $E_{L2}$ of the laser chamber LK, and it is preferably at ground potential. The electrode 2 of the stripline capacitor $C_F$ makes contact with the electrode $E_{F2}$ of the switching gap F and with the electrode 3 of the stripline capacitor $C_K$ and is preferably at high potential, namely, that of the high-voltage source HV. The electrode 4 of the capacitor $C_K$ is connected to the electrode $E_{L1}$ of the laser chamber LK, which is connected via a large resistance $R_K$ or an inductance to the electrode $E_{L2}$, which is preferably at ground potential. As mentioned, these structures or arrangements can be provided n-times parallel to each other at the laser chamber LK and the switching gap F, the electrodes lying in planes normal to the laser axis o.

Considerable importance is then ascribed to the low-inductance contact between the stripline capacitor plates and the electrodes. The perspective view according to FIG. 3, which simultaneously provides a cross-sectional view, shows that the plate 1 of the capacitor $C_F$ makes contact with the electrode $E_{F1}$ surrounding the switching gap F by means of two lugs f1. This electrode $E_{F1}$ has a somewhat E-shaped cross section with two outer legs e11 and e11 and a middle leg e12. A highly temperature- and corrosion-resistant high-grade steel alloy, such as tunsten alloy, especially, is used as material for the electrode $E_{F1}$, $E_{F2}$ of the switching gap F. For the electrodes of the laser chamber, halogen-resistant metals such as high-grade steel or aluminum, for example, are used. All those wall portions of the switching gap F and the laser chamber LK, which are not formed by electrode material, are connected to each other and to the electrodes by temperature-stable, UV radiation-resistant plastic material, such as PVDF (polyvinylidene fluoride), for example, or a high-purity $Al_2O_3$ ceramic so that, in the interior of the switching gap F and the laser chamber LK, the gas mixture contained therein can be kept at the desired pressure (as a rule between 50 mbar up to several bar). The hereinafore-mentioned insulating wall portions are identified in FIG. 3 by reference character $w_F$ for the switching gap F and by $w_L$ for the laser chamber LK. The individual plates or foils for the dielectric d protrude, in the respective edge zones, beyond the electrodes 1, 2, 3, 4, as is illustrated by the contour of the capacitor stack K, so that leakage or flashover paths in the outer or edge region are avoided. While the electrode 1 of the capacitor $C_F$ in FIG. 3 is shown by a solid outline, electrode 2 within the lines 1 is indicated by a broken line sequence 2; it is connected by a lug F2 to the electrode $E_{F2}$ of the spark chamber F. This electrode $E_{F2}$ is connected to the wall part $w_F$. As to the contacts, attention must be given to the fact that they are made with an inductance which is as small as possible and, as far as possible, bifilar. The capacitor electrode 4 is indicated in FIG. 3 by a dot-dash line; it makes contact via the connecting lug f4 with the electrode $E_{L1}$ of the laser chamber LK which is connected to the wall part $w_L$. The other electrode $E_{L2}$ of the laser chamber LK has, as a mirror image of the switching gap F, likewise an approximately E-shaped cross section with two outer electrode legs e21, e21 and a middle leg e22, forming the electrode $E_{L2}$ proper and disposed opposite and spaced from the counterelectrode $E_{L1}$. The two electrode legs e21, e21 make contact with the plates of the capacitor $C_F$ via the two lugs f1. Instead of the double-lug contact f1, f1 for the electrode $E_{F1}$ of the switching gap F and the electrode $E_{L2}$ of the laser chamber LK, a single-lug contact could also be provided in the inner region shifted in the laser axis relative to the lugs f2, f4, however, the contact shown has especially low inductance and has largely oppositely directed loops and is therefore bifilar, as can be visualized from the course of the pulse currents during the discharge process in the switching gap and in the laser chamber.

As can be seen in FIG. 2, the electrodes 2, 3 of the capacitors $C_F$ and $C_K$ are conductively connected to each other via a wide lug 23; instead of this wide connecting lug 23, the electrodes 2, 3, as mentioned hereinbefore, could also be made as one piece and brought into the form thereof shown in FIG. 2 by bending. The electrodes 2, 3 could also, however, be formed of a single metal sheet or plate. When constructing the capacitor stack, care should be taken that the electrodes 2, 3 and 1 are insulated for high voltage from the electrode $E_{L1}$ and the electrodes 2, 3 and 4 similarly from the electrode $E_{L2}$, as is indicated by the dielectric d. It may further be of advantage to place the entire capacitor stack in an oil tank or in a water tank (as explained hereinafter).

As is further shown in FIG. 2, respective adjacent capacity units $C_{F,K}$ are arranged in direction of the stack, with the electrodes 1, 2, 3 and 4 and the dielectric layers d thereof mirror-symmetrical with respect to a symmetry plate s,s imagined as extending normally to the laser axis between the two capacity units $C_{F,K}$. As mentioned hereinbefore, only n=2 capacity units $C_{F,K}$ are shown in FIG. 2; if one imagines two further capacity units i.e. a total of n=4, as being in FIG. 2, then the third and the fourth capacity unit $C_{F,K}$ would likewise be arranged mirror-symmetrically with respect to each other. It follows therefrom that the electrodes 4,4, which are statically and dynamically at the same potential, are opposite each other, so that no high-voltage insulation is necessary between these two electrodes 4,4.

FIG. 3 shows that the base area of the individual stripline capacitors $C_F$, $C_K$ and of the capacity units $C_{F,K}$, respectively, is substantially rectangular and, accordingly, the capacitor stack K is somewhat prismatic, and that the laser chamber LK and the corresponding connecting lugs f1, f1; f4 are arranged on an elongated side 11 of the prism. The switching gap F and the associated electrodes $E_{F1}$, $E_{F2}$ and connecting lugs f1, f1; f2 are then advantageously arranged on the other elongated side 12.

When the two FIGS. 2 and 3, which represent a preferred embodiment, are viewed together, it is apparent that the laser chamber LK and the fast high-voltage switching gap F realized in this case as an extended spark gap are disposed on the opposite elongated sides 11 and 12 of the capacitor stack K, and an electrode 2, 3 common to the first and the second stripline capacitor $C_F$, $C_K$ is disposed as a folded band or ribbon bent somewhat hairpin-like between the other two electrodes 1 and 4 of the stripline capacitors $C_F$ and $C_K$ in such a manner that the one folded-band half 2 is directly opposite the electrode 1 which is connected between a respective electrode $E_{L2}$ of the laser chamber LK and a respective electrode $E_{F1}$ of the switching gap F. The other (second) folded-band half 3 is directly opposite the electrode 4, which is connected to the second electrode $E_{L1}$ of the laser chamber LK, the folded-band or ribbon electrode 2, 3 being connected by the folded-band half 2 thereof to the second electrode $E_{F2}$ of the switching gap F. In the embodiment illustrated in FIGS. 2 and 3, the laser chamber LK and the spark chamber F are of substantially tubular construction with a rectangular outer cross section. A detailed description of the laser chamber, for instance, the preionization device, is dispensed with herein, since it is not required for an understanding of the invention.

Figure 4:
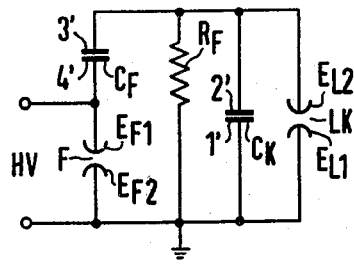
FIG. 4 is a diagram of a so-called charge-transfer circuit, as is found as an alternative to the Bluemlein circuit in the state of the art for generating laser excitation pulses.
Figure 4A:
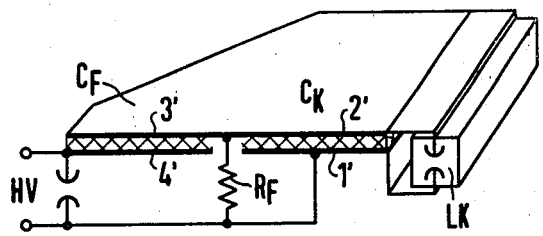
Figure 5:
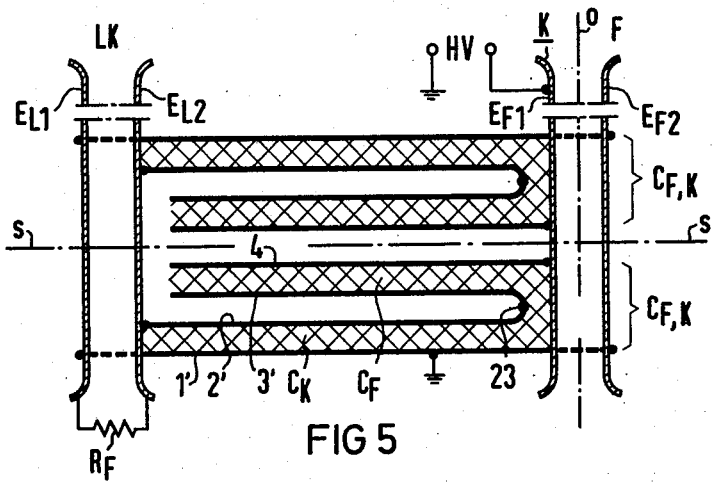
FIG. 5 is a view similar to that of FIG. 2 of a second embodiment of an excitation system according to the invention based upon the charge-transfer circuit according to FIG. 4.

A second embodiment of the invention is shown in FIG. 5 and is based upon a charge-transfer circuit which serves as a circuit for generating the laser excitation pulses. The corresponding circuit diagram, which is per se within the state of the art, is shown in FIG. 4. For a better understanding of the operating of this circuit shown in the diagram of FIG. 4, it has been transposed in FIG. 4A into a three-dimensional or perspective view of a stripline arrangement. The capacitor electrodes are identified by the same reference characters in FIGS. 4, 4A and 5 as in FIGS. 1, 1A and 2 but with the addition of a prime. On the other hand, the reference characters identifying the laser chamber LK, the switching gap F (in this case again constructed as a spark gap), and the first and second stripline capacitors $C_F$ and $C_K$ remain exactly the same. It is seen from FIGS. 4, 4A that, in this circuit, the second stripline capacitor $C_K$ is connected in parallel with the electrodes $E_{L1}$, $E_{L2}$ of the laser chamber LK; that a high resistance $R_F$ (instead of which an inductance L could also be used) is connected in parallel with the capacitor $C_K$; and that the series circuit formed of the first stripline capacitor $C_F$ and the switching gap F is connected in parallel with the resistor $R_F$, the high-voltage source HV being connected to the two electrodes $E_{F1}$, $F_{F2}$ of the switching gap F, the high potential of the high-voltage source HV to the electrode $E_{F1}$ and the ground potential thereof to the electrode $E_{F2}$. This circuit operates so that, if the spark gap F is fired via the capacitor $C_F$, the capacitor $C_K$ is charged up, the latter, in turn, feeding the electric energy into the laser chamber LK.

By comparing FIGS. 5 and 2, it can be found that the spatial arrangement of the excitation system in FIG. 5 is effected in a manner similar to that of FIG. 2. A detailed description of this second embodiment of FIGS. 4, 4A and 5, as well as a perspective view thereof corresponding to that of FIG. 3 for the first embodiment of FIGS. 1, 1A and 2 are therefore dispensed with. In particular, the arrangement in FIG. 5 is also provided so that the laser chamber LK and the switching gap F are disposed on opposite elongated sides of the capacitor stack K, and an electrode 2', 3' common to the first and the second stripline capacitors $C_F$ and $C_K$, respectively, is disposed as a folded-band or ribbon, bent somewhat hairpin-like between the other two electrodes 1', 4' in such a manner that one folded-band half 2' lies directly opposite the electrode 1' which is connected between a respective electrode $E_{L1}$ of the laser chamber LK and a respective electrode $E_{F2}$ of the switching gap F. The second folded-band or ribbon half 3', on the other hand, lies directly opposite the electrode 4' which is connected to the second electrode $E_{F1}$ of the switching gap F, the entire folded-band or ribbon electrode 2', 3' being connected to the second electrode $E_{L2}$ of the laser chamber LK. Everything stated hereinbefore with respect to the first embodiment of FIGS. 1, 1A and 2 as to the number n of the capacity units $C_{F,K}$ and as to the mirror-symmetrical arrangement applies also to this second embodiment of FIGS. 4, 4A and 5.

Of considerable importance for the excitation system of the first and the second embodiments and those described hereinafter is the fast high-voltage switching gap F, for which, for example, fast individual spark gaps or fast thyratrons, which are well know per se from the scientific and technical literature, are suitable. The excitation system according to the invention, however, additionally provides ways of reducing considerably the inductance of the switching gap as compared to that of an individual spark gap or an individual thyratron, so that the extremely short switching times which are required are assured. A measure or feature which is effective in that sense is shown schematically in FIG. 6. In this regard, several or, generally, n individual spark gaps of the switching gap F are connected in parallel with each other. The undivided counterelectrode is identified as $E_{F2}$ in FIG. 6 and the electrode as a whole as $E_{F1}$. However, the latter has many small electrodes $E_{F11}$, $E_{F12}$ and so forth. For this purpose, n holes b are formed in the electrode wall $w_{F1}$ located one behind the other i.e. serially, in the longitudinal direction p of the switching gap F. A trigger pin T of suitable material (high-grade steel, tungsten), insulated by insulating bushings i, is screwed into each of the holes b, so that the trigger pins T are insulated from the wall $w_{F1}$ against high voltage. The individual electrodes $E_{F11}$, $E_{F12}$ and so forth, therefore, form collar-shaped regions in the wall $w_{F1}$ which, in its entirety, represents the electrode $E_{F1}$. During operating of the switching gap F, a high-voltage pulse of short rise or buildup time is applied to each of the trigger pins T, so that a breakdown from the trigger pin to the electrode $E_{F1}$ and to the respective subelectrode $E_{F11}$, $E_{F12}$, respectively, and to the counterelectrode $E_{F2}$ occurs. Due to this triggered predischarge, the gas space of the switching gap is pre-ionized and the main discharge from $E_{F1}$ to the counterelectrode $E_{F2}$ is released suddenly, whereby the switching gap $E_{F1}$...$E_{F2}$ becomes conducting.

Figure 6:
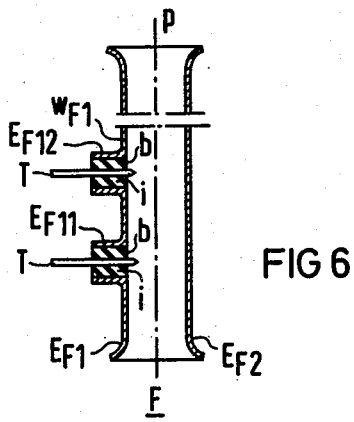
FIG. 6 is a longitudinal sectional view of a fast high-voltage switching gap forming part of the embodiments of FIGS. 2 and 3, in which trigger pins are inserted into one electrode and which may be used to advantage for the embodiment.
Figure 7:
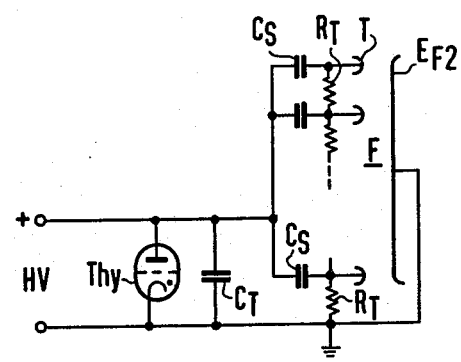
FIG. 7 is a diagram of a circuit according to the invention for generating the high-voltage pulses for a fast high-voltage switching gap according to FIG. 6.

The high-voltage pulse which fires the switching gap according to FIG. 6, is generated by the circuit shown in FIG. 7. The trigger pins T, in the latter circuit, are connected via respective trigger capacities $C_S$ to the high-voltage pole of a common switching capacity $C_T$ and are connected on the trigger-side thereof via compensating or balancing resistors (or inductances) $R_T$ to each other and to ground potential. Parallel to the switching capacity $C_T$, there is connected, for example, a fast-switching thyratron or a spark gap for releasing the firing pulses. Also, the counterelectrode $E_{F2}$ of the switching gap F is connected to ground potential. The broken line in FIG. 7 indicates that a multiplicity of the T-$C_S$-$R_T$ branches may be provided in addition to the three illustrated ones. The trigger pins T are at the same potential through the inductances or high resistances $R_T$. The capacitors $C_S$ and $C_T$ are charged up to high voltages. By firing the thyratron Thy or the spark gap, a high-voltage pulse with steep rise or build-up is applied to the trigger pins T, which leads to uniform spark development at all of the trigger pins T and the opposing electrode $E_{F2}$ and, thereby, to uniform firing and volume-wise discharge of the entire switching gap F.

Figure 8:
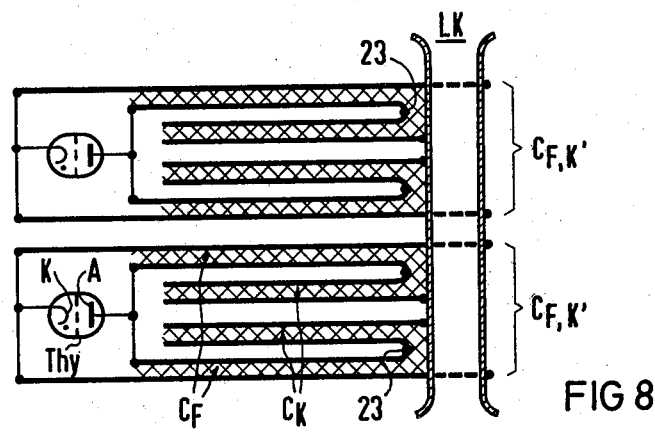
FIG. 8 is a view like those of FIGS. 2 and 5 of a third embodiment of an excitation system according to the invention having a fast high-voltage switching gap formed by n parallel-connected thyratrons and based upon a Bluemlein circuit as in the first embodiment according to FIGS. 2 and 3.
Figure 9:
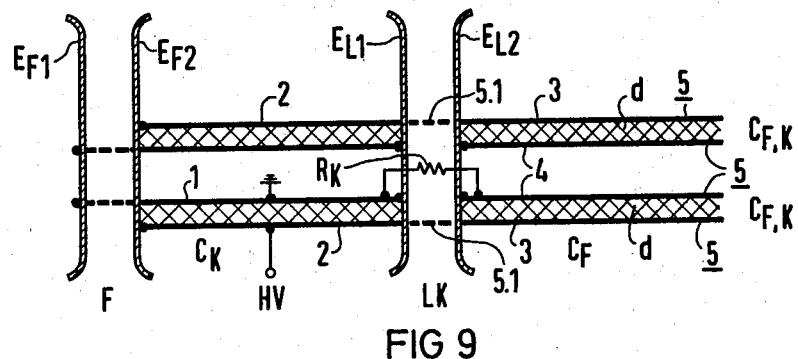
FIG. 9 is a view corresponding to those of FIGS. 2, 5 and 8 of a fourth embodiment of an excitation system according to the invention, in which all of the capacitor electrodes are disposed unfolede in plane parallel arrangement, and the laser chamber passes through a cutout in the electrode, this embodiment being also based upon a Bluemlein circuit.
Figure 10:
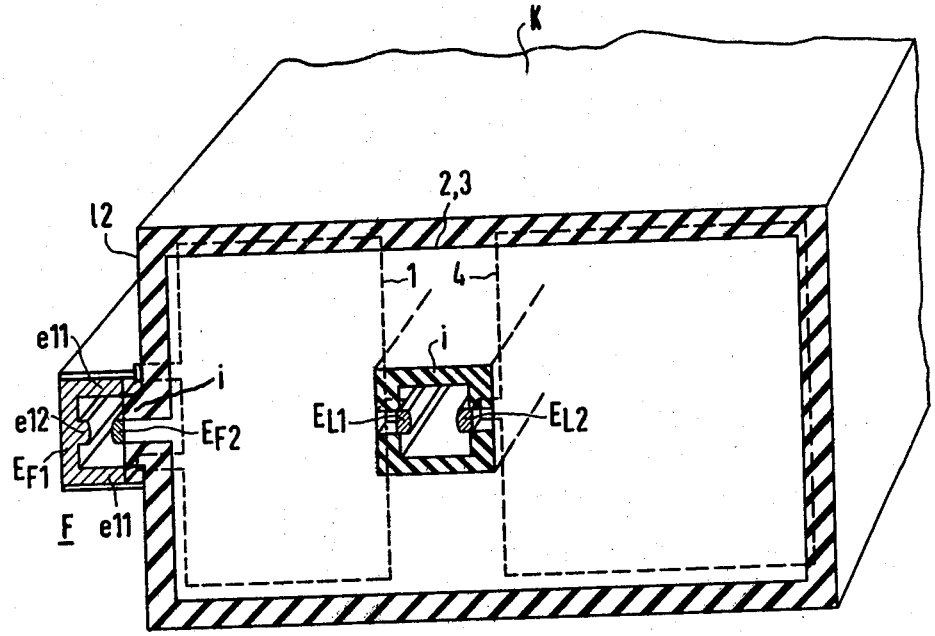
FIG. 10 is a perspective view of the embodiment according to FIG. 9.

Another possibility for associating a switching gap F having low inductance with the laser LK is to connect n thyratrons in parallel. All thyratrons must be addressed for this purpose, simultaneously, by a suitable firing pulse. A third embodiment of the invention according to FIG. 8 shows, in a greatly simplified manner, in a view corresponding to those of FIGS. 2 and 5, the construction of a laser, in a Bluemlein circuit with n thyratrons (of which only two are shown), as the switching gap. Respectively, n' capacitors $C_F$ and $C_K$ (n' being an integral multiple of n) are combined in a capacitor stack $C_{F,K'}$ which is, respectively, switched by a thyratron. The respective anodes and cathodes of the thyratrons can be connected to each other conductively via resistors or via inductances (not shown). Otherwise, the arrangement corresponds to that of FIG. 2, for which reason elements which are analogous to those of FIG. 2 are identified by the same reference characters. The capacitor substacks $C_{F,K'}$ respectively, encompass two capacity units $C_{F,K}$ according to FIG. 2 (n'=2n). Depending upon the capacity of the stripline capacitors $C_{F,K}$ and, therefore, depending upon the switching power, a respective thyratron could also be assigned to each capacity unit $C_{F,K}$ (note FIG. 2). In FIGS. 9 and 10, a fourth embodiment of an excitation system is shown in presentation analogous to that of FIGS. 2 and 3, which is likewise based upon a Bluemlein circuit. Among other things, this arrangement affords the accommodation of a greater number of capacitor plates of the capacitors $C_F$ and $C_K$ per stack length i.e. a greater number in comparison with the embodiment of FIGS. 2 and 3. The first and second stripline capacitors $C_F$ and $C_K$ are thus accommodated on plates indentified as a whole by reference numeral 5, each thereof being formed with cutouts 5.1 for passing therethrough the laser chamber LK insulated for high voltage. The chamber for the fast high-voltage switching gap F is arranged in FIGS. 9 and 10 at the outer periphery on the left-hand side and at the longitudinal side of the capacitor stack at the left-hand side of the Figures, respectively, disposed axially parallel to the laser.

In FIG. 10, the electrode of the capacitors $C_F$ and $C_K$ at high-voltage potential is represented by a solid line 2, 3. The electrodes 1 and 4 which lie directly opposite this electrode 2, 3, with the dielectric d interposed, are represented by broken lines in FIG. 10. The insulating layers of the laser chamber LK and of the switching gap F are identified by reference character i; they serve for insulating the electrodes $E_{L1}$ and $E_{L2}$ of the laser chamber and the electrodes $E_{F1}$, $E_{F2}$ of the switching gap F from those electrodes of the capacitors $C_F$ and $C_K$ which are not at the same potential. Otherwise, those parts in FIGS. 9 and 10 which have the same functions as corresponding parts in FIGS. 2 and 3 are identified by the same reference characters. As is evident, the laser chamber LK extends somewhat centered through the capacitor stack K. Here, too, the illustrated rectangular cross section and the prismatic shape of the capacitor stack K, respectively, are particularly advantageous from the point of view of high packing density and manufacturable construction; it is possible, however, to select cross-sectional shapes deviating from the rectangular shape i.e. squares, ellipses or approximately circular shapes, if this appears advantageous in view of the specific application.

The embodiment of the invention according to FIGS. 9 and 10 can also be realized as a charge transfer circuit instead of by a Bluemlein circuit. With respect to the fast high-voltage switching gap F, the same remarks apply which appear hereinbefore in connection with the first three embodiments of the invention.

Figure 11:
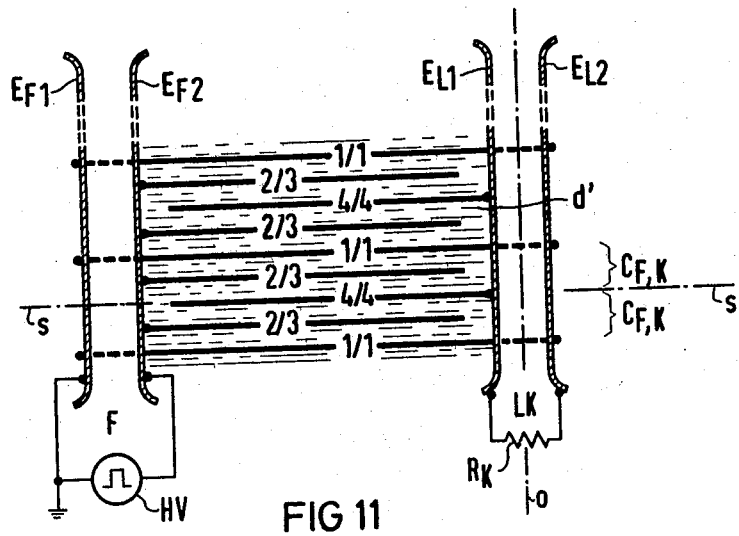
FIG. 11 is a view similar to that of FIG. 2, for example, of a fifth embodiment of the excitation system similar to the first embodiment of FIG. 2, in which a liquid, preferably water, is used as the dielectric.

In FIG. 11, an embodiment of the invention similar to that of FIG. 2 is shown, which affords a further increase of the energy density by providing that water be used as the dielectric layer d'. In this case, the electrodes 1/1, 2/3 and 4/4, which had up to now been constructed individually, are, respectively, combined into one plate. Corrosion-resistant high-grade steel is preferably used as the plate material. Since water retains its high insulation ability only for a few microseconds, the high-volltage d-c voltage source HV is replaced by a pulse-charging device. The pulse width or duration of the charging pulse must be small in comparison with the time which the high voltage would require for a breakdown through the water insulation path, and must be large in comparison with the discharge time of the entire excitation system. In particular, the capacitor $C_F$, $C_K$ is briefly charged by the pulse-charging method i.e. less than 10 μs, prior to the firing of the switching gap. Otherwise, the arrangement is logically the same as that according to FIGS. 2 and 3. The particular advantages of the construction according to FIG. 11 are, apart from the higher dielectric constant or E-value, the possibility of more intensive cooling (water cooling), higher energy density and the self-healing properties of the water dielectric.

In a preferred embodiment, the illustrated excitation systems operate as high-energy excimer lasers, since the excimer lasers specifically ensure a high radiation yield with respect to the excitation energy. As mentioned hereinbefore, the excimer laser is described in detail, for example, in literature reference (2) so that it is unnecessary to explain its operation and its gas composition further in the instant application. The use of the excitation system for $CO_2$-, Cu-vapor or $N_2$ lasers is also within the scope of the invention since, whereby, the spectrum of the laser radiation can be varied i.e. differently colored laser light in the visible range as well as invisible (UV and infrared) laser light can be generated.

In addition, the excitation system according to the invention is highly suitable, because of the high energy density thereof, for applying high-energy high-voltage pulses to two electrodes, especially for the purpose of generating high-energy pulses in electron beam guns or in Marx generators.

There are claimed:

1. An excitation system for fast pulsed discharge with excitation by a highly homogeneous arc-free capacitor-discharge in a gas space between and defined by two mutually opposed electrodes disposed within a discharge chamber in a laser, the two electrodes extending in mutual alignment, parallel to the optical axis of the laser and having edges spaced from one another, and with first and second stripline capacitors for low-induction energy-storage, the stripline capacitors having electrodes connected within a pulse-forming network to the laser electrodes and to electrodes of a fast high-voltage switching gap, respectively, high-voltage pulses for the laser electrodes being producible through ignition of the high-voltage switching gap by means of discharge of the stripline capacitors, dielectric layers disposed between the capacitor electrodes, the dielectric layers and the capacitor electrodes extending normally to the optical axis of the laser and being stacked parallel to the optical axis of the laser in a capacitor stack, and laterally extending connecting lugs connecting the capacitor electrodes within the pulse-forming network to the electrodes of the laser chamber, comprising, in the direction in which the dielectric layers and the capacitor electrodes are stacked, mutually adjacent, miniature common capacitance units of the individual stripline capacitors disposed, respectively, with the capacitor electrodes and dielectric layers thereof mirror-inverted relative to an imaginary symmetry plane extending normally to the laser axis between said capacitance units so that the mutually opposing capacitor electrodes of the respectively mutually adjacent capacitance units are at the same potential and are combinable into common capacitor electrodes.

2. An excitation system according to claim 1 wherein mutually adjacent capacitance units formed of said first and second stripline capacitors are disposed, respectively, in the direction in which the dielectric layers and the capacitor electrodes are stacked, with said capacitor electrodes and dielectric layers thereof being mirror-inverted relative to an imaginary symmetry plane extending normally to the laser axis between said capacitance units.

3. An excitation system according to claim 1 wherein the individual stripline capacitors and capacitance units, respectively, have a basic, rectangular shape and said capacitor stack is parallelepipedal, the laser chamber and said connecting lugs associated therewith being disposed at a longitudinal side of said parallelepipedal stack.

4. An excitation system according to claim 3 wherein the laser chamber and the fast high-voltage switching gap are disposed on opposite longitudinal sides of said capacitor stack, and the capacitor electrode, respectively, common to the first and the second stripline capacitor is disposed as a hairpin-shaped folded band between respective other capacitor electrodes of said stripline capacitors so that one half of said folded band is disposed directly opposite the capacitor electrode connected between one of the electrodes of the laser chamber and one electrode of the switching gap, and the other half of said folded band, is disposed directly opposite a capacitor electrode connected to either one of another electrode of the laser chamber and another electrode of the switching gap, the folded-band capacitor electrode being connected to either one of said one electrode of the switching gap and said one electrode of said laser chamber.

5. An excitation system according to claim 3 wherein said fast high-voltage switching gap is a tubular spark gap having the electrodes thereof extending parallel to the axis of the laser, said tubular spark gap being disposed on a side of said capacitor stack facing away from the laser chamber and being connected by said electrodes thereof to the laterally extending connecting lugs of the respective capacitor electrodes.

6. An excitation system according to claim 1 including a Bluemlein circuit in which the first and the second stripline capacitors are connected for generating a laser excitation pulse.

7. An excitation system according to claim 1 including a charge-transfer circuit in which the first and the second stripline capacitors are connected for generating a laser excitation pulse.

8. An excitation system according to claim 1 wherein said fast high-voltage switching gap is a substantially tubular spark gap, said substantially tubular spark gap being formed with electrode bores normal to the axis of said substantially tubular spark gap and distributed along the length of said spark gap, trigger pins insulatingly received in said electrode bores and being energizable by a high-voltage ignition pulse applicable thereto.

9. An excitation system according to claim 8 comprising a common switching capacitance having a high-voltage pole, a plurality of trigger capacitances, said trigger pins being connected via said trigger capacitances to said high-voltage pole of said common switching capacitance and, on a side of said trigger capacitances connected to said trigger pins, said trigger capacitances being connected to one another and to ground potential via balancing impedances selected from high-resistivity resistances and inductances, one of a fast switching thyratron and a fast switching spark gap being connected in parallel with said common switching capacitance for releasing an ignition pulse.

10. An excitation system according to claim 1 wherein n partial capacitor stacks encompass at least one respective capacitance unit of the capacitor stack, the fast high-voltage switching gap comprising n thyratrons connected in parallel with one another, a respective thyratron being operatively associated with a respective partial capacitor stack.

11. An excitation system according to claim 1 wherein the capacitor electrodes of the first and the second stripline capacitors are formed with a cutout for the laser chamber, said laser chamber being disposed, insulated for high-voltage, within said cutout, the fast high-voltage switching gap being disposed, on the other hand, at the outer periphery of the capacitor electrodes in parallel with the laser axis.

12. An excitation system according to claim 1 wherein the dielectric layers are formed of dielectric liquid, said capacitor electrodes being at the same potential and being united into metal plates immersed in said dielectric liquid.

13. An excitation system according to claim 12 wherein said dielectric liquid is chemically pure water.

14. An excitation system according to claim 1 wherein the laser is an excimer laser.

15. An excitation system according to claim 1 wherein the laser is a $CO_2$ laser.

16. An excitation system according to claim 1 wherein the laser is a Cu-vapor laser.

17. An excitation system according to claim 1 wherein the laser is a $N_2$ laser.

18. An excitation system according to claim 1 wherein the wall of at least one of the laser chamber and the high-voltage switching gap is formed of pure $Al_2O_3$ ceramic having a purity of at least 95%.

19. An excitation system according to claim 1 in combination with an electron beam gun for generating high energy pulses therefor.

20. An excitation system according to claim 1 in combination with a Marx generator for generating high energy pulses therefor.

21. An excitation system for fast pulsed discharge with excitation by a highly homogeneous arc-free capacitor discharge in a gas space between and defined by two mutually opposed electrodes disposed within a discharge chamber in a laser, the two electrodes extending in mutual alignment parallel to the optical axis of the laser and having edges spaced from one another, and with first and second stripline capacitors for low-induction energy storage, the stripline capacitors having electrodes connected within a pulse-forming network to the laser electrodes and to electrodes of a fast high-voltage switching gap, respectively, high-voltage pulses for the laser electrodes being producible through ignition of the high-voltage switching gap by means of discharge of the stripline capacitors, dielectric layers disposed between the capacitor electrodes, the dielectric layers and the capacitor electrodes extending normally to the optical axis of the laser and being stacked parallel to the optical axis of the laser in a capacitor stack, the laser electrodes being at a potential different from that at which the electrodes of the stripline capacitors are and being isolated from the capacitor electrodes, comprising isolating wall regions at least partly defining the laser chamber and formed of a material different from that of the laser electrodes, the laser electrodes extending within the laser chamber parallel to the optical axis of the laser, said isolating wall regions being connected to one another and to the laser electrodes so as to maintain a gas mixture in the laser chamber at a given chamber pressure.

22. An excitation system according to claim 21 including laterally extending connecting lugs connecting the capacitor electrodes to the laser electrodes within the pulse-forming network.

* * * * *